United States Patent [19]

Arvidsson

[11] Patent Number: 5,035,446
[45] Date of Patent: Jul. 30, 1991

[54] ADJUSTABLE STEERING WHEEL

[75] Inventor: Hans-Olof Arvidsson, Gothenburg, Sweden

[73] Assignee: AB Volvo, Gothenburg, Sweden

[21] Appl. No.: 435,470

[22] PCT Filed: Jun. 13, 1988

[86] PCT No.: PCT/SE88/00317
§ 371 Date: Nov. 28, 1989
§ 102(e) Date: Nov. 28, 1989

[87] PCT Pub. No.: WO88/10205
PCT Pub. Date: Dec. 29, 1988

[30] Foreign Application Priority Data

Jun. 15, 1987 [SE] Sweden .................... 870248

[51] Int. Cl.⁵ ............................................. B62D 1/18
[52] U.S. Cl. ..................................... 280/775; 74/493
[58] Field of Search ......................... 280/775; 74/493

[56] References Cited

U.S. PATENT DOCUMENTS 4,598,604  7/1986  Sorsche ................................ 74/493
4,602,520  7/1986  Nishikawa ........................... 74/493
4,893,518  1/1990  Matsumoto ......................... 74/493

FOREIGN PATENT DOCUMENTS 3634977    4/1987   Fed. Rep. of Germany .
59-220454 12/1984  Japan .
60-12375   1/1985   Japan .
60-157962  8/1985   Japan .
60-157963  8/1985   Japan .
61-218476  9/1986   Japan ................................ 74/493
62-39363   2/1987   Japan ................................ 74/493
62-74766   4/1987   Japan ................................ 74/493

Primary Examiner—Charles A. Marmor
Assistant Examiner—Karin Tyson
Attorney, Agent, or Firm—Young & Thompson

[57] ABSTRACT

A steering wheel arrangement for automotive vehicle, including a steering wheel (13), a steering column (12, 14) carrying the steering wheel, and servomotor (20, 21) for making positional adjustments to the steering wheel in the direction of the column axis and at angles thereto. A spring device is coordinated with switches in the electric circuits serving the servomotors. When the spring device is deformed to a given extent, as a result of an adjustment force applied to the steering wheel, the spring device will activate the switches and therewith energize the setting motors, so as to change the position of the steering wheel.

5 Claims, 1 Drawing Sheet

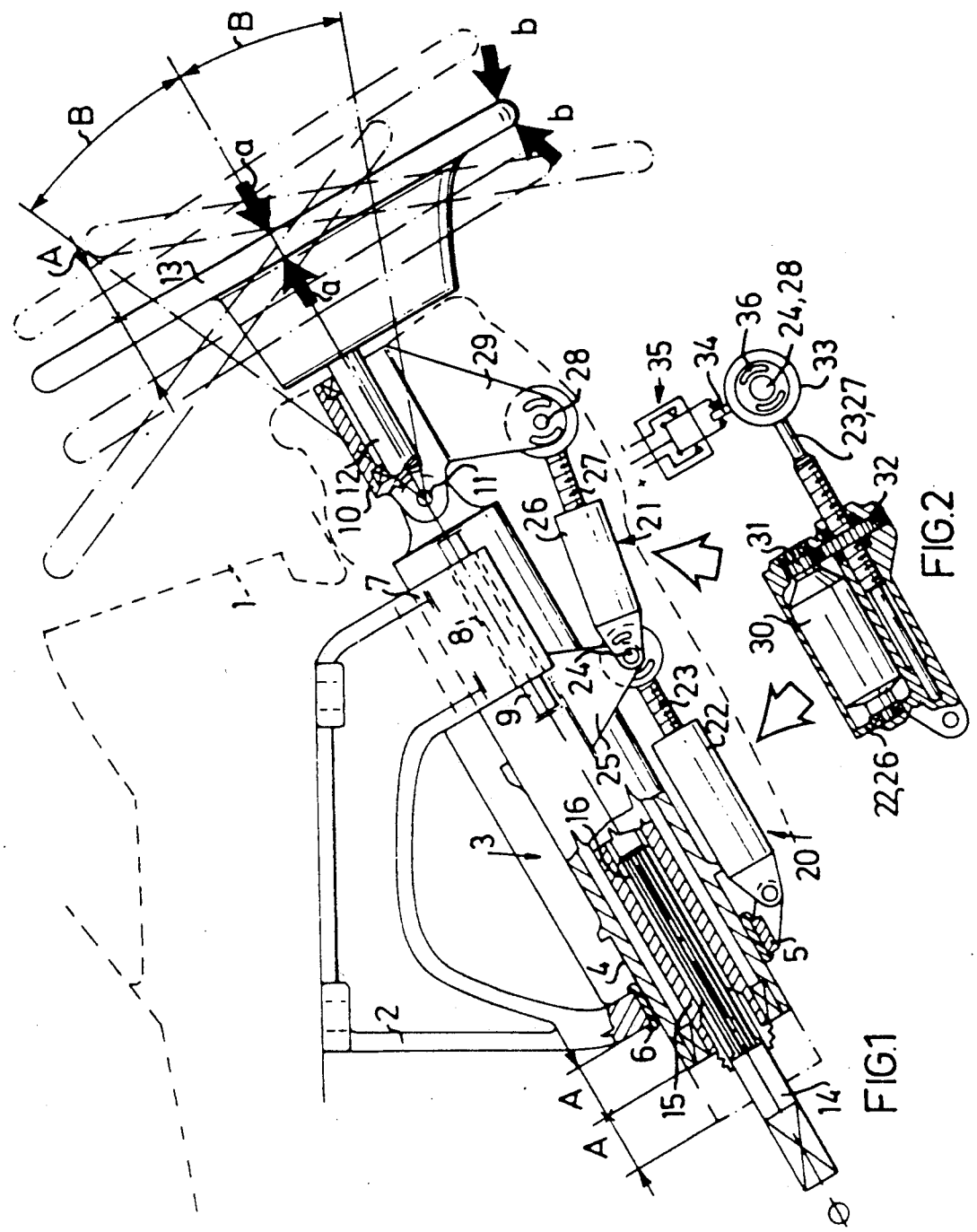

ADJUSTABLE STEERING WHEEL

The present invention relates to a steering wheel arrangement intended for automotive vehicles and including a steering wheel, a steering column which carries the steering wheel, and means for adjusting the position of the steering wheel in the direction of the steering column and/or with respect to the angle at which the steering wheel is inclined to said column.

Hitherto known steering wheel arrangements with adjustable steering wheels include manually operable catch devices and are so configured that the actual adjustment to the steering wheel position is effected totally through the force applied to the steering wheel by the driver of the vehicle. The adjustment is thus effected through a completely manual procedure, in which the driver first releases the catch, e.g. with the aid of a knob or an operating lever of the same kind as the lever used for operating the direction blinkers or indicators of the vehicle. While holding the catch released, the driver then moves or tilts the steering wheel to the position desired, whereafter he releases the catch operating lever, so as to lock the steering wheel in its new position.

With this type of steering wheel arrangement, it is difficult to finely adjust the position of the steering wheel while driving the vehicle. The telescopic joints and toggle joints required to enable the steering wheel to be adjusted to mutually different axial and angular positions must not present excessive resistance to the adjustment, but must "respond freely", which combined with the fact that the catch operating lever must be "held in" during the whole of the adjustment procedure, makes it difficult to reach the ideal position quickly while driving the vehicle. For instance, if the driver desires to stretch his arms while driving and therefore wishes to push away the steering wheel to some slight extent, the normal result of this procedure is that the steering wheel is moved backwards and forwards by the driver a few times, until an ideal steering wheel position is reached, which is a drawback and undesirable with regard to traffic safety, since the possibility of turning the steering wheel with the catch lever depressed is very limited.

The object of the present invention is to provide a steering wheel arrangement of the kind disclosed in the introduction which is easier to adjust than the known arrangements and which will enable the steering wheel to be adjusted quickly to precisely the position desired by the driver in a traffic safe fashion.

This object is achieved in accordance with the invention in that the steering wheel adjustment means include at least one setting motor for effecting adjustment movements and means for detecting the force acting on the steering wheel in the adjustment direction, said means being effective in starting the setting motor upon detection of a predetermined force in the adjustment direction and holding the motor active until the force acting in said adjustment direction falls beneath said predetermined force.

When utilizing the inventive arrangement, it is not necessary for the driver of a vehicle to release or apply any form of catch when adjusting the position of the steering wheel. All that the driver is required to do is to apply a higher pressure or pulling force than usual on the steering wheel in the adjustment direction. When the steering wheel is moved into the desired, new position under influence of the setting motor, the adjustment procedure is terminated by easing the pressure or force applied by the driver on the steering wheel. The driver of the vehicle is in full control of the vehicle during the whole of the adjustment procedure.

The invention will now be described in more detail with reference to an exemplifying embodiment thereof illustrated in the accompanying drawing, in which FIG. 1 is a partially sectioned side view of one embodiment of the inventive steering wheel arrangement; and FIG. 2 is a longitudinal sectional view of a setting motor.

In FIG. 1 the reference numeral 1 identifies the instrument panel of an automobile indicated in broken lines. Mounted beneath the instrument panel is a supporting bracket structure 2 for a steering column tube generally referenced 3. The tube, or jacket, 3 has a main part 4 which is mounted for axial displacement in the bracket structure 2. To this end, the bracket structure 2 includes a bottom sleeve 5 which has an insert 6 made of suitable low-friction material. Located at the upper end of the bracket structure is a pair of flanges 7 which project downwardly on respective sides of the part 4 of the steering column tube and which have provided therein grooves 8 into which axially extending ribs 9 on the tube part 4 project. The steering column tube 3 also comprises an upper, shorter part 10 which is pivotally mounted at 11 to the tube part 4, so as to be able to swing in the longitudinal vertical plane of the vehicle.

A part 12 of a steering shaft is mounted for rotation in the tube part 10 while being held against axial movement in said tube part. The outer end of said part carries a steering wheel 13. The aforesaid part 12 of the steering shaft extends into the tube part 4 via a suitable, known universal coupling whose pivot axis coincides with the rotational axis of the tube part 10. The steering shaft part 12 and a lower steering shaft part 14, intended for coupling to the steering gear (not shown) of the vehicle, extend into a sleeve 15 which is journalled for rotation in the tube part 4 but held against axial movement therein, and are each nonrotatably, but axially movably connected to the sleeve 15 by means of a respective spline coupling, of which only the lower coupling 16 is shown. This latter arrangement is intended to allow adjustments to be made intentionally to the position of the steering wheel and also to ensure that the whole of the steering arrangement can "collapse" in the event of a collision.

The aforedescribed embodiment enables positional adjustments to be made to the steering wheel 13, both in the direction of the longitudinal axis of the tube part 4 and also with regard to the angle of the steering wheel to said axis. In accordance with the invention, the actual adjustments are carried out with the aid of two setting motors 20, 21, which in the case of the illustrated embodiment comprise two electric servomotors.

The servomotor 20 is operative in effecting the axial adjustment and is housed in a housing 22 pivotally mounted in the lower sleeve 5 of the bracket structure 2. The operating rod 23 of the motor 20 is connected to a shaft pin 24 rigidly mounted between a pair of lugs 25 on the tube part 4 of the steering column. Consequently, when the rod 23 is displaced axially in relation to the housing 22, the steering column tube 3 will be moved axially in relation to the bracket structure 2 and therewith change the axial distance between the steering wheel 13 and the instrument panel 1. The maximum distance between the respective terminal positions of the steering wheel, indicated in chain lines, is referenced "A" in FIG. 1.

The servomotor 21 is operative in effecting angular adjustments to the steering wheel position, and is housed in a housing 26 which is pivotally mounted on the shaft pin 24. The operating rod 27 of the motor 21 is joined to a shaft pin 28 which is rigidly mounted between a pair of lugs 29 on the tubular part 10 of the steering column. The tubular part 10 can be angled between the angular positions indicated in chain lines in FIG. 1, by displacement of the rod 27 relative to the housing 26.

FIG. 2 illustrates the construction of the servomotor 20, 21 in more detail, and also illustrates schematically the means used for starting and stopping the motors. Respective motor housings 22, 26 include an electric motor 30. The output shaft of the respective motors carries a gear wheel 31 which meshes with a gear ring 32 on a nut which engages a screwthreaded part of respective operating rods 23, 27. The outer ends of the respective operating rods are provided with a sleeve 33 which has on its outer periphery a shoulder 34 which projects between a pair of metal contacts on a make-and-break switch 35 incorporated in the electric circuit in which the motor is connected. The sleeve 33 on respective operating rods, or arms, 23, 27 engages around its respective shaft pin 24, 28 through the intermediary of a resilient element 36, which may be a bush made of an elastic material.

Each of the switches 35 is intended to accompany the part whose position is changed by its respective servomotor, i.e. the steering column parts 4 and 10, wherein the modus operandi of the arrangement is as follows:

When wishing to change the position of the steering wheel in an axial direction, a force is applied symmetrically with respect to the steering column, as indicated by the arrow "a" in FIG. 1. In response to this force, the tube part 4 of the steering column, and therewith also the switch 35, will be displaced relative to the operating rod 23, and therewith also relative to the shoulder 34, with deformation of the resilient or spring element 36 caused by the shaft pin 24, wherewith when a predetermined force is reached, with resultant deformation of the element 36, the switch 35 will be activated so as to start the servomotor and displace the tube part 4 of the steering column in the intended direction with a subsequent change in the position of the steering wheel. This adjustment to the position of the steering wheel is continued for as long as deformation of the resilient element 36 is maintained as a result of the driver "following" the adjustment movements performed, this deformation of the element 36 being necessary in order for the shoulder 34 to hold the switch 35 activated. When the driver lightens the pressure or load on the steering wheel, so that the resilient element 36 can centre the shaft pin 24 in the sleeve 33, the shoulder 34 is also centred between the contacts of the switch 35, thereby breaking the current to the servomotor and locking the steering wheel in its adjusted position. The need for additional locking devices can be obviated, by using servomotors of the self-locking screw-nut type.

When wishing to make an angular adjustment to the position of the steering wheel, there is applied thereto a force which is asymmetric with regard to the steering column, as indicated by the arrows "b" in FIG. 1. The angular adjustment is then effected through the action of the servomotor 21, the course of events being fully analogous with that described above.

As will be understood, it lies within the scope of the invention to provide a steering wheel arrangement which has only one of the aforedescribed adjustment facilities. Furthermore, servomotors other than electrical, self-locking nut and screw type servomotors may be used. When the servomotors used are not self-locking, it will be necessary to provide separate locking devices which co-act with the servomotors in a manner such that the locking devices will be deactivated and activated respectively when the motors are started and stopped.

I claim:

1. A steering wheel arrangement for automotive vehicles, including a steering wheel, a steering column carrying the steering wheel and housing a steering shaft, and means for adjusting the position of the steering wheel in the direction of the steering column and/or with regard to an angle to said column, the adjustment means comprising at least one setting motor (20, 21) for effecting adjustment movements of the steering wheel relative to the steering column, and means (34, 35, 36) for detecting the force acting on the steering wheel (13) in the adjustment direction said force detecting means being adapted to start the setting motor when the force acting on the steering wheel (13) in said adjustment direction has a predetermined value and to hold the setting motor in an active running state until the force acting in said adjustment direction falls beneath said predetermined force value, the setting motor (20, 21) being an electric servomotor, wherein said electric servomotor rotates a nut (32) on a screw-threaded portion of an operating rod (23, 27) which is connected via an elastically deformable element (36) to that part of the steering column tube (4; 10) which is movable relative to the housing of said servomotor; and in that an operating element (34) for operating a switch (35), which is stationary relative to the movable tube part of said steering column, is so connected to the operating rod (23, 27) that the operating element will bring the switch to an activated state upon a given state of deformation of the elastically deformable element (36).

2. An arrangement according to claim 1, wherein the steering column comprises a first shaft part (14), which is connected to a steering gear, and a second shaft part (12) which is connected with the steering wheel (13), said shaft parts being coupled together telescopically and journalled in an outer steering column tube (3) which can be moved axially relative to a rigid vehicle member, e.g. an instrument panel (1), by means of the setting motor (20), the second shaft part (12) connected to the steering wheel being held axially in relation to said column tube.

3. An arrangement according to claim 1, wherein the steering shaft (12, 14) is hinged and journalled in an outer steering column tube (3) which includes two parts (4, 10) which can be adjusted angularly relative to one another and between which the setting motor (21) is operative for making adjustments to the angular position of the steering wheel relative to the axial direction of the steering column.

4. An arrangement according to claim 1, wherein the means for detecting the force acting on the steering wheel in the adjustment direction comprises said elastically deformable element (36) that resists movement of the steering wheel in the adjustment direction and an activator (34, 35) which forms part of an activating circuit and which upon deformation of the insert element in response to a force of predetermined value acting in the adjustment direction makes the activating circuit, so as to start the setting motor, said elastically deformable element (36) breaking the activating circuit upon release of force on the steering wheel.

5. An arrangement according to claim 1, wherein the elastically deformable element is a bush insert (36) located in a sleeve (33) which is connected with the operating rod and on which there is provided a rigid shoulder (34) which functions as an operating element; and in that a shaft (24, 28) connected to the adjustable steering column tube part extends through the bush.

* * * * *